United States Patent
Sears et al.

[11] Patent Number: 5,559,417
[45] Date of Patent: Sep. 24, 1996

[54] ELECTRONICALLY COMMUTATED TWO-AXIS GYRO CONTROL SYSTEM

[75] Inventors: Jerome Sears, Wyckoff; Walter Parfomak, Wallington; Walter J. Kluss, Kearny, all of N.J.

[73] Assignee: AlliedSignal Inc., Morris Township, N.J.

[21] Appl. No.: 241,300

[22] Filed: May 11, 1994

Related U.S. Application Data

[63] Continuation-in-part of Ser. No. 985,091, Dec. 2, 1992, Pat. No. 5,313,148.

[51] Int. Cl.$^6$ ................................................. G05B 17/00
[52] U.S. Cl. ........................................ 318/689; 74/5.6 D
[58] Field of Search ............................... 318/439, 138, 318/254, 689; 312/640, 805, 432; 388/911, 803, 807; 74/5.4, 5.47, 5.6 A, 5.6 D, 5.7, 5.8, 5.22

[56] References Cited

U.S. PATENT DOCUMENTS

| | | | |
|---|---|---|---|
| 4,694,210 | 8/1987 | Elliott et al. | 318/138 X |
| 4,743,815 | 5/1988 | Gee et al. | 318/254 |
| 5,182,499 | 1/1993 | Inaji et al. | 318/254 |
| 5,235,264 | 8/1993 | Kaneda et al. | 318/138 X |
| 5,313,148 | 5/1994 | Sears et al. | 318/689 |

*Primary Examiner*—Jonathan Wysocki
*Attorney, Agent, or Firm*—Verne E. Kreger, Jr.; Howard G. Massung

[57] ABSTRACT

A two degree of freedom gyroscope having a drive motor (20), with a permanent magnet rotor (22), which includes an optical sensor (11) for providing an X-axis signal and a Y-axis signal which are indicative of the displacement of the actual rotor (22) spin axis from the null spin axis (28), a torquer coil (26) looped around the permanent magnet rotor (22) and disposed in a plane orthogonal to the null spin axis, and torquer drive elements (52, 54, 56) responsive to the X-axis and Y-axis signals induced in the sensor when the actual rotor (22) spin axis is displaced form the null spin axis (28) for providing current to said torquer coil (26) to urge the axes to coincide. A voltage induced in an open phase of a two phase motor stator is used to provide the instantaneous position of the rotor poles to obtain correct phasing information for commutation of the single polar torquer.

7 Claims, 9 Drawing Sheets

ELECTRONICALLY COMMUTATED TWO-AXIS GYRO CONTROL SYSTEM

CROSS REFERENCE TO RELATED APPLICATIONS

This application is a continuation-in-part of U.S. patent application Ser. No. 07/985,091, filed Dec. 2, 1992, U.S. Pat. No. 5,313,148 issued May 17, 1994, entitled Electrically Commutated Two Axis Gyro Control System.

BACKGROUND OF THE INVENTION

The present invention relates to gyroscopes and more particularly to a permanent magnet rotor, two degree of freedom gyroscope which utilizes dual-axis sensors and electronic commutations of a single torquer coil for closing the rotor positioning servo loop to obtain two-axis control.

It is known in the art to use permanent magnet motors for driving inertial gyroscope sensing instruments. U.S. Pat. No. 4,818,922 describes a prior art permanent magnet motor drive for a gyro rotor. Permanent magnet motors are utilized in inertial gyroscope sensing instruments where optimum efficiency, rate stability and low run up time are required. The drive motors include a two phase stator, permanent magnet rotor and suitable drive circuitry to start, run up and maintain synchronous speed. The rotor is supported by a hydrodynamic bearing wherein the spinning rotor supplies the pressurized fluid for the bearing. One of the stator phases is the driven phase and the other phase is open.

In conventional two degree of freedom gyros, two separate control paths are utilized using an angle sensor on each axis and a torque transducer acting about each axis. The conventional means of closing the X-Y loops in a two degree of freedom instrument are described in U.S. Pat. No. 4,862,050. In conventional two degree of freedom gyro loop implementations two separate control paths are utilized using an angle sensor on each axis and a torque transducer acting about each axis. The separate angular sensors are used for sensing tilt about stationary X and Y axes and two separate torquers are used for implementing two stationary servo loops to urge the actual rotor spin axis to the nominal or null spin axis. The output signals from the two sensors serve as inputs to the torquer servo control electronics. The servo control electronics extracts and processes the angular displacement information and provides the drive currents to the two torquers to obtain two axes control.

In conventional angular momentum based two degree of freedom gyroscopes which utilize electronic closed loop control law means it is normal to use two separate torquer coils, one for each rate sensitive axis, to urge the gyro float or rotor to null with respect to the gyro housing as sensed by the gyro's position pick-offs which generate a position signal. A significant disadvantage to having separate X and Y torquers is the costly alignment procedure required to obtain orthogonality between the two torquer coils. If there is a misalignment between the torquers, the gyro's performance is impacted. For instance, due to a misalignment between the two torquer coils, when a rate is applied about a single axis there is a deflection about a single axis, however current flowing in one torquer coil will produce a component of torque along both axes. This results in a deflection about both axes when only a single axis needs to be rebalanced. This deflection about the wrong axis will have to be rebalanced causing erroneous rate information about that axis.

The present invention eliminates the use of two torquers and utilizes the disclosed electronically commutated two-axis gyro control scheme and a single torquer to obtain two axis control of the gyro rotor. Utilizing a single torquer coil alleviates stringent alignment procedures, reduces the cost and improves performance. By utilizing a single torquer coil and obtaining orthogonality electronically, as disclosed herein, an improved gyro can be obtained. The circuit of the present invention is particularly suitable for controlling a miniature two degree of freedom gyro as disclosed in U.S. Pat. No. 5,070,289.

SUMMARY OF THE INVENTION

A method and apparatus for operating a two degree of freedom permanent magnet motor gyroscope utilizing a unique electronic commutation circuit and a single torquer disposed in a plane orthogonal to the gyro spin axis to obtain two axis control. A voltage induced in the windings of an open phase of a two phase stator is used to provide the instantaneous position of the rotor poles to obtain correct phasing information for commutation of the single polar torquer. A pair of optical pick-off sensors detect the relative angle of the rotor with respect to the gyro housing as a consequence of angular rates applied to the gyro about its input axes. Each pick-off sensor output and its associated electronic channel provide both magnitude information and servo compensation to ensure stability. The two processed pick-offs are then commutated and summed resulting in a current to the torquer of the proper magnitude and phase to generate a torque vector to rebalance the sensed tilt on both axes.

The single torquer coil utilizes at least one winding loop lying in a plane orthogonal to the gyro's reference or null spin axis and disposed in close proximity to the rotating permanent magnet rotor. When the actual rotor spin axis is displaced from the reference or null spin axis, a signal is induced in the optical pick-off sensors providing gyro tilt information. The sensor tilt information is propagated along a pair of electronic channels, one for the X-axis and one for Y-axis signals which each include a servo compensation network, a nutation notch filter and a commutation switch which is responsive to the induced voltage in the open stator phase windings which provides the rotor pole position. The sensor tilt information is phase and magnitude conditioned along the way prior to activating a single torquer driver electronic stage. The single torquer drive combines the output of the X-axis commutation switch and the Y-axis commutation switch to provide a single drive current. A single magnetic torquer is utilized to rebalance, on an instantaneous basis, the sensed tilt. As the gyro wheel rotates at high rpm the correct single torque drive current is generated and applied to the single torquer at the correct phase and magnitude to rebalance the sensed tilt.

The particular attribute of this invention is that generating torques about two orthogonal axes is precisely obtained by electronic timing means. The electronics needed to perform this function are simple, inexpensive and have proven reliability. Cross-axis errors using the disclosed unique technique are significantly reduced.

DETAILED DESCRIPTION OF THE PREFERRED EMBODIMENTS

A two degree of freedom angular rate sensor or gyroscope is used primarily for tactical applications. The gyroscope is constructed with three basic components: a hydrodynamic bearing component; a spin motor and torquer component and a signal generator or pick-off component. The gyroscope includes a spherical hydrodynamic fluid bearing rotor, a permanent magnet motor/torquer (FIG. 3) and an optical pick-off to provide two axes of rate information in a small package. The miniature tactical angular rate sensor which is operated according to the invention is supported within members which provide a suitable hermetically sealed case or housing for the sensor.

The rotor when rotating, generates a pressurized layer of gas which suspends the rotor within its housing. The housing includes a spherical cavity. Thus, with the arrangement described, the rotor is supported within the cavity on a fluid cushion, and which fluid may be a suitable gas, so that the rotor is free to rotate about X and Y pick-off axes and a rotor spin axis Z, resulting in a two degree of freedom arrangement as is desired.

Figure 2:
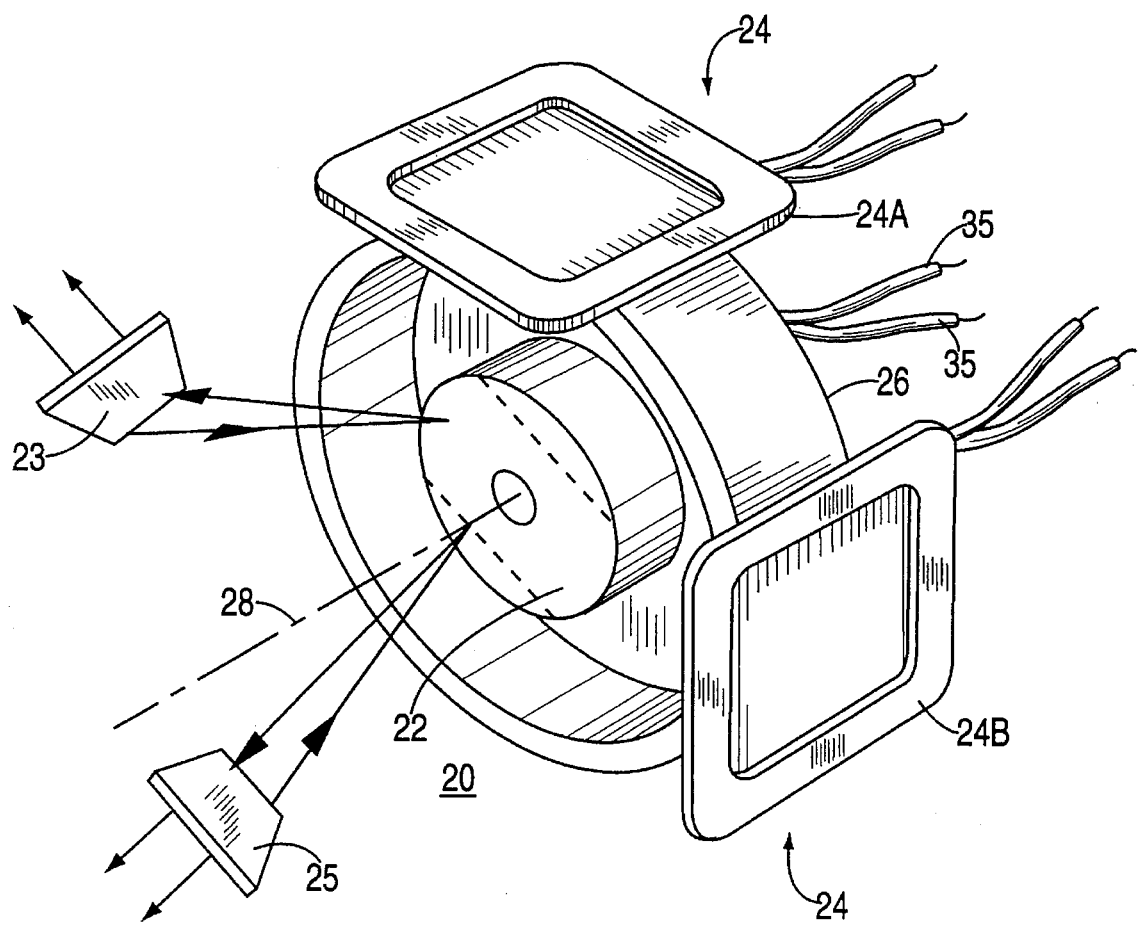
FIG. 2 is an isometric representation of the permanent magnet rotor which rotates in the same plane as the single circular torquer coil in the nulled equilibrium state.

The spin motor and torquer component includes a single permanent magnet 22 and an ironless stator 24 supporting windings 24A and 24B for the spin motor and windings 26 for the torquer as shown in FIG. 2.

With particular reference to FIG. 2, rotor magnet 22 is a two pole, cylindrical, permanent magnet mounted on the sensor rotor through the center thereof. Permanent magnet rotor 22, which has a reflective surface, is surrounded by torquer windings 26 which, in turn, are surrounded by motor stator windings 24A and 24B which are actually four separate winding arrangements, only two of which are shown. Opposite winding arrangements 24A represent a driven phase of motor stator 24, and opposite winding arrangements 24B represent an open phase of the motor stator.

Figure 9:
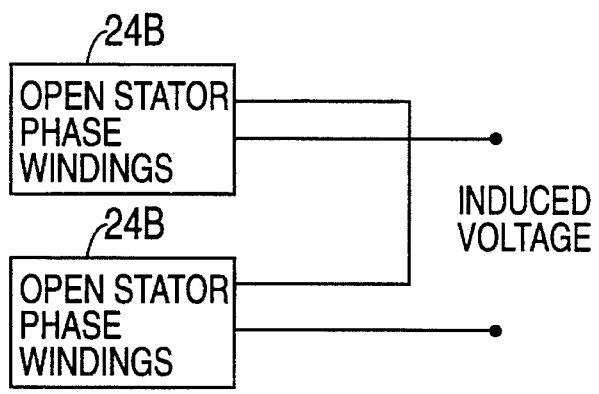
FIG. 9 is a block diagram illustrating a series arrangement of the open phase stator windings whereby a voltage is induced for providing the instantaneous position of the rotor poles.

For the purposes of the invention opposite open phase windings 24B are connected in series. That is to say, one of the two leads from each of the opposite open phase windings are jumped and the other two leads provide outputs relating to the location of the poles of magnet 22 for continuous two phase closed loop operation, and in this regard, reference is made to FIG. 9. A commutator arrangement is driven by a conditioned feedback signal from the series connected open phase windings and applies a drive signal to provide proper rotor polarity and synchronization. This signal is suitably amplified and provides the required power to accelerate and maintain the rotor at a particular commanded speed.

Torquer windings 26 in cooperation with magnet 22 maintain the rotor properly positioned in the cavity 16 of the housing. This is achieved by the torquer arrangement including magnet 22 and windings 26 applying the proper force required to null out the output signals from the optical pick-off component. The output signals provide continuous information of the position of magnet 22 while the conditioned open phase winding outputs provide the commutation angle relative to the rotor housing.

The output signals, along with the commutation signals, are processed to provide a current output to the torquer 26 arrangement aforenoted. The magnitude and phase of this current output is applied to the torquer 26 arrangement to generate an axial field of the desired strength and timing, such that a net desired torque is provided to correct the rotor position of rotor magnet 22. The current is resolved through circuitry described hereinafter to determine the applied rate information for each of the X and Y axes.

Figure 6:
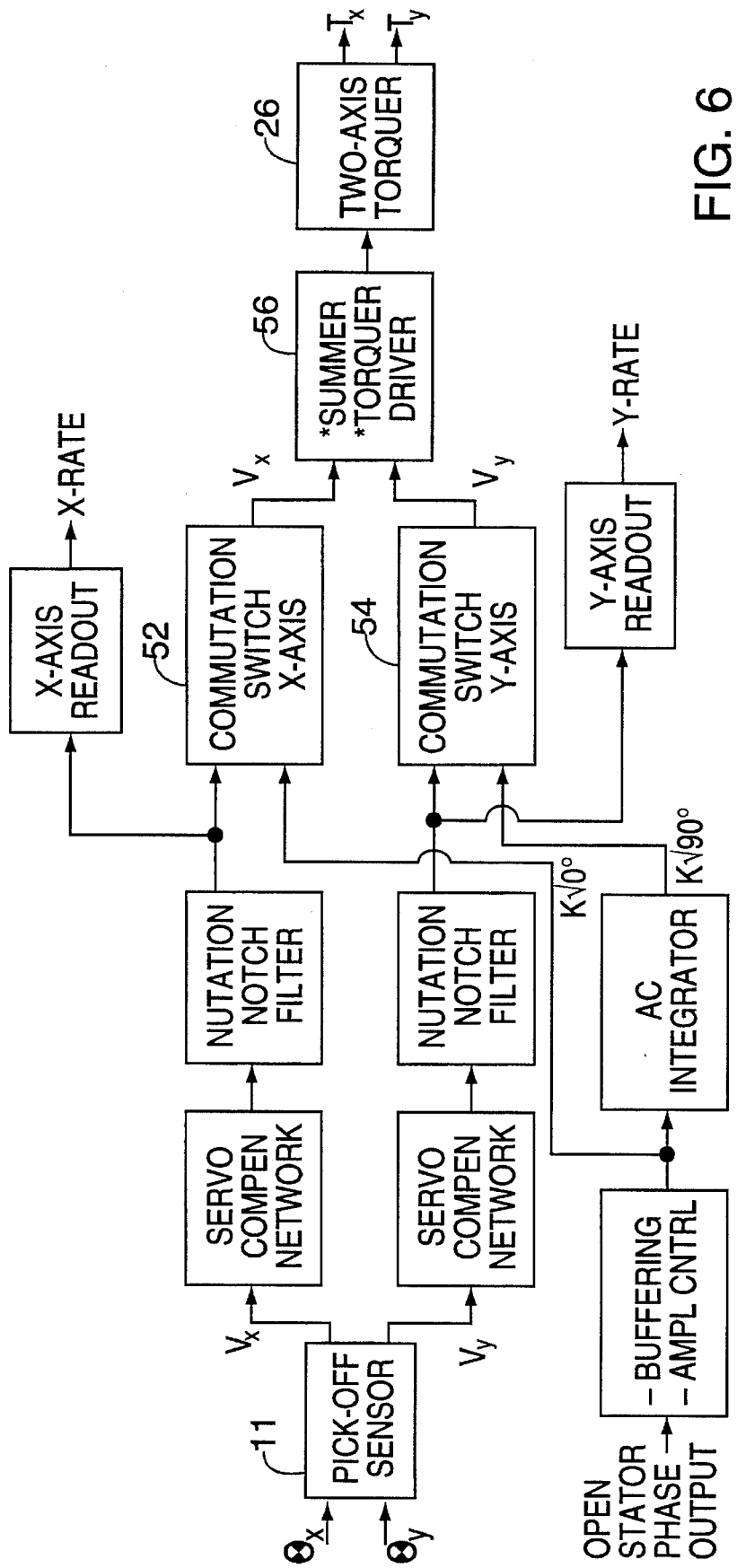
FIG. 6 is a block diagram showing the operation of the electronically commutated, two axis gyro control circuit and torquer rebalance system according to the present invention.

With particular reference to FIGS. 2 and 6, the pick-off 11 designated by the numeral in FIG. 6 is utilized to sense the relative angle of the sensor rotor as a result of rates applied to the gyro sensor about its input axes. Thus, pick-off 11 includes a light emitting diode light source, an optical beam splitter, a lens, the reflective surface of rotor magnet 22 and an optical quadrant detector.

The optical quadrant detector is a four cell photodiode quadrant detector, and reacts to light energy for generating a proportional current output. The current from each quadrant is summed and differentially amplified by the pick-off electronics. At pick-off null, the light reflected from the reflective surface of magnet 22 equally illuminates all four quadrants of the detector. This occurs when the rotor is centered in the cavity of the housing 15.

Off null, i.e. when the sensor rotor has precessed, the reflected beam differentially illuminates the four quadrants. Thus, some quadrants receive more illumination while opposite quadrants receive less. This results in a differential electrical output which is converted by the processing electronics to linear output signals proportional to the angular position of the rotor. These output signals are utilized by feedback loops as will be hereinafter described. The construction of optical quadrant 40 on a common substrate as is the case provides two axes of rate information and tends to be self-compensating for temperature sensitivity effects.

The beam splitter redirects the reflected light beam so that light source and quadrant detector need not be co-linear. In the absence of the beam splitter, a central hole through the quadrant detector would be necessary and an alternate mechanization would be provided. The beam splitter is configured to reflect fifty percent of the beam at the diagonal interface at each pass. The remaining fifty percent is transmitted, without reflection. The lens is used to properly focus the reflected light beam.

U.S. Pat. No. 5,070,289 describes in detail the construction of a gyroscope which can be modified by torquer and control circuitry according to the invention disclosed herein. Referring now to FIG. 2, there is illustrated a two degree of freedom permanent magnet gyroscope drive motor 20. Mechanization of rate sensing in a two degree of freedom instrument requires that the rotor 22 be maintained in a fixed orientation relative to the gyro housing or case. Two axis analog servo electronics are used to capture rotor 22 attitude. The control loops force the gyro to be a nulling instrument. Any angular deviation of the rotor 22 is detected by the optical pick-off signal generator 11, which includes optical pick-offs 23, 25 and a torque moment is produced by the torquer 26 on the rotor 22 in such a sense as to reduce the angular deviation to null. The permanent magnet drive motor 20 includes a permanent magnet rotor 22 and a two phase stator 24 having four windings, only two of which are shown. Two windings 24A are for driven stator phase A, and two windings 24B are for open stator phase B. The permanent magnet rotor 22 drives the rotating portion of a gyroscope to spin around a reference or null spin axis 28. The windings of stator 24 create the necessary torque to accelerate and maintain the rotor 22 at synchronous speed. The induced outputs from open phase windings 24B connected in series as aforenoted provide the instantaneous position of the rotor poles for both motor and torquer commutation. The optical pick-offs, 23 for the X-axis and 25 for the Y-axis sense the relative angle of the rotor 22 as a consequence of angular rates applied to the gyroscope about its input axes.

A circular member is disposed around and in close proximity to rotor 22. Circular member lies in a plane substantially orthogonal to the spin axis 28. Circular member includes an embedded torquer coil 26, with leads 35, which includes a plurality of loops extending around spin axis 28. When the actual spin axis of rotor 22 is displaced from the reference spin axis 28, a signal is induced in the optical pick-off sensors 23 and 25 which are part of the pick-off unit 11. The signals induced in the sensor 11 are conditioned and amplified and fed to the torquer coil to urge the permanent magnet rotor 22 to a position wherein the reference axis 28 coincides with the actual rotor spin axis and the spinning rotor 22 and circular member which includes the torquer winding 26 lie in a common plane orthogonal to spin axis 28.

Figure 1:
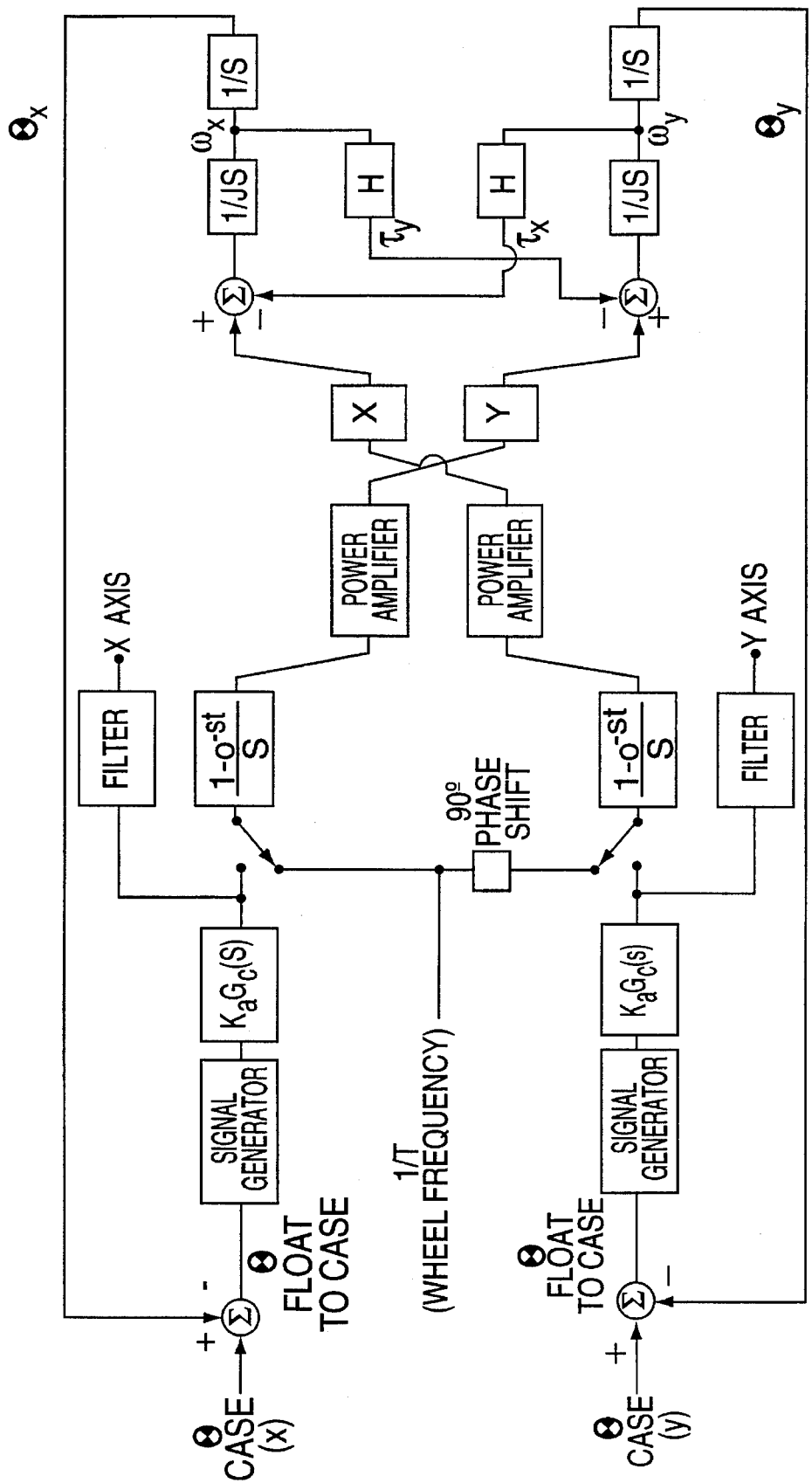
FIG. 1 is a block diagram representation showing the servo control loops of the present invention.

A simplified block diagram illustrating the kinematics of the rate sensing system is shown in FIG. 1. Due to the inherent symmetry of the mechanical plant and its servo electronics transfer function it will suffice to discuss operation of a single axis channel. Referring to FIG. 1 for a description of operation, a case to inertial rate about the X-axis will result in an angular deflection, $\Theta$ case(X) which will be sensed by the X-axis pick-off. This sensed angular signal is processed by the KaGa(s) electronics. The resulting output is directed via the commutation represented by a sampler, $(1-e^{**}-sT)/s$, to provide a torque into the cross-axis, Y-axis torque summing member. The ensuing rotor rate on the Y-axis couples gyroscopically, via angular momentum H, into the X-axis pivot resulting in a torque on the X-axis which urges the angular deflection to null.

Figure 3:
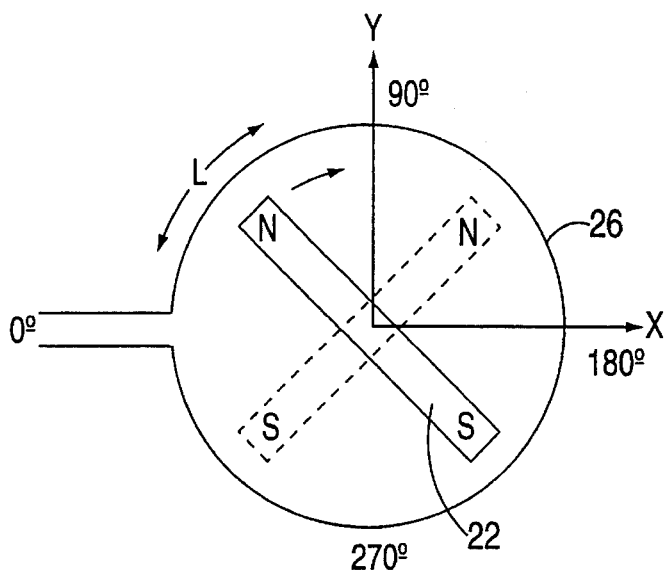
FIG. 3 is a schematic view of a permanent magnet rotor, with a single torquer loop lying in a plane orthogonal to the spin axis, which is useful for describing the present invention.
Figure 3A:
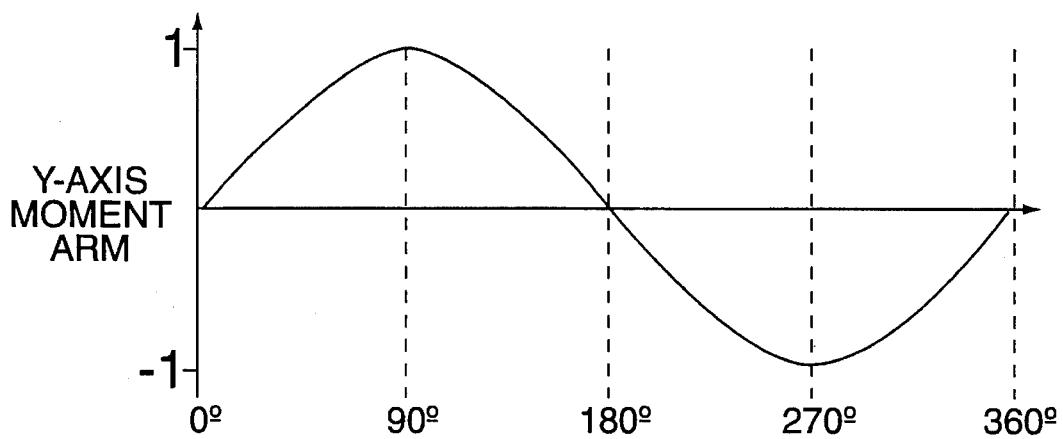
FIGS. 3a and 3b show the moment arm about the X-axis and about the Y-axis for various positions of the permanent magnet rotor with respect to the torquer.
Figure 3B:
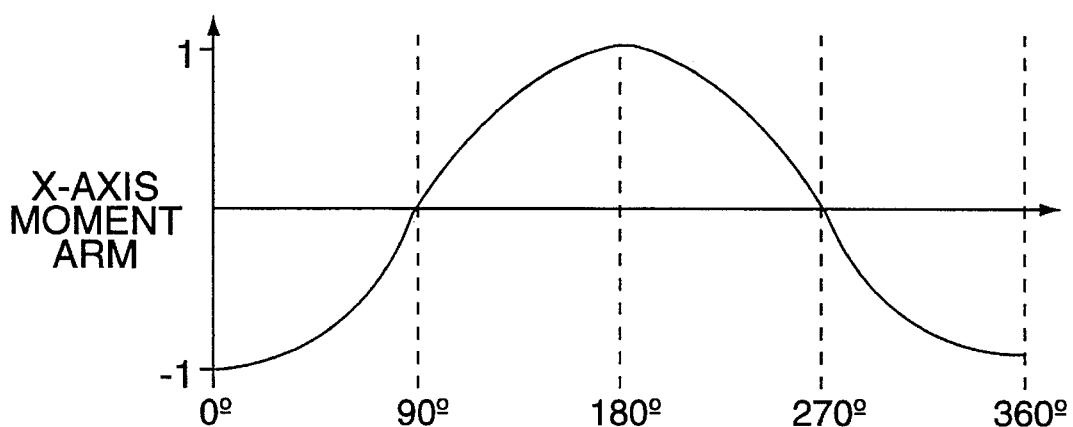

Referring now to FIGS. 3, 3a and 3b for the following explanation of torquing two axes with a single torquer coil 26. As the N-pole permanent magnet of rotor 22 rotates clockwise from 0 degrees the moment arm with respect to the Y-axis is sinusoidal with phasing as shown in FIG. 3a. That is maximum torque about the X-axis can be obtained if current is flowing through the torquer coil when the N-pole is at the 90 degree or the 270 degree location. The direction of the force, either into or out of the plane, is controlled by the polarity of the permanent magnet 22, North or South, and the direction of current flowing through the torquer coil, clockwise or counterclockwise. The same follows for the X-axis whose sinusoidal moment arm is shown in FIG. 3b.

Figure 4A:
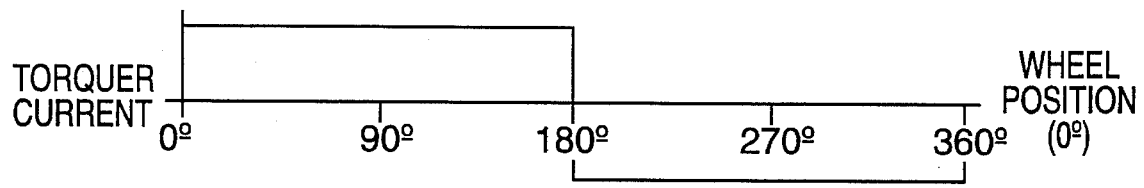
FIGS. 4a, 4b and 4c are waveforms, for the torquer rebalance current, the X-axis torque and the Y-axis torque when the actual spin axis is tilted about the Y-axis.
Figure 4B:
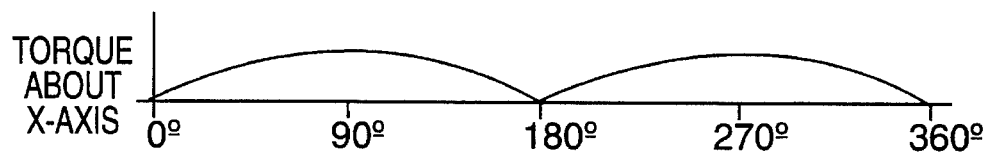
Figure 4C:
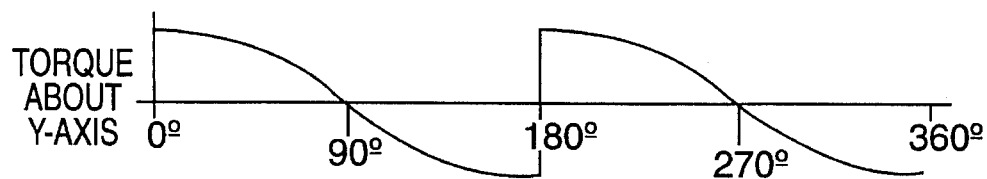

Referring now to FIGS. 4a, 4b and 4c, there is illustrated the current and torque waveshapes generated when an angular rate is applied to the Y-axis and zero rate is applied to the X-axis. FIG. 4a is the current applied to the torquer 26 which is in phase with the X-axis moment arm as directed by the conditioned induced open stator phase voltage The resulting torque waveform, FIG. 4b includes the average torque to rebalance the rotor and some second harmonic ripple torque at a frequency twice the wheel speed. The torque waveform in FIG. 4c is applied to the cross-axis, Y-axis. The waveform of FIG. 4c consists of second harmonic ripple and contains no DC average, generates not net torque on the rotor 22.

Figure 5A:
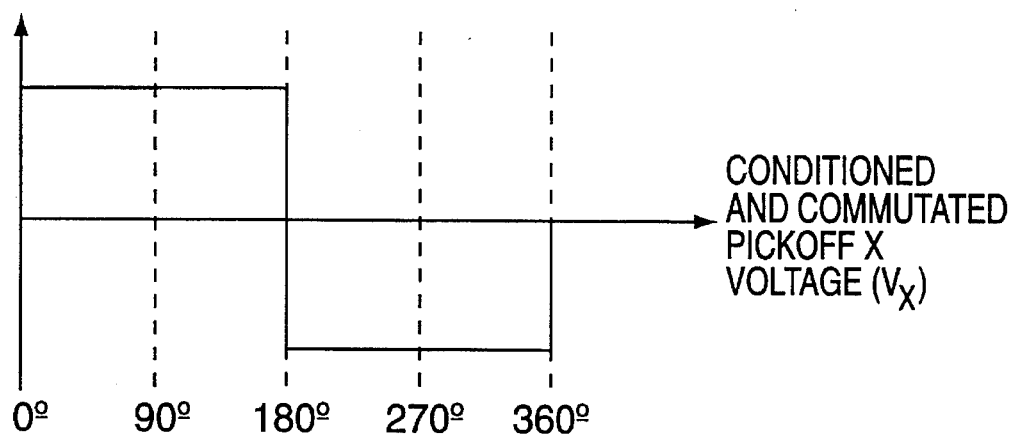
FIGS. 5a through 5f depict the waveshapes resulting from equal and simultaneous angular rates applied to both the X-axis and the Y-axis.
Figure 5B:
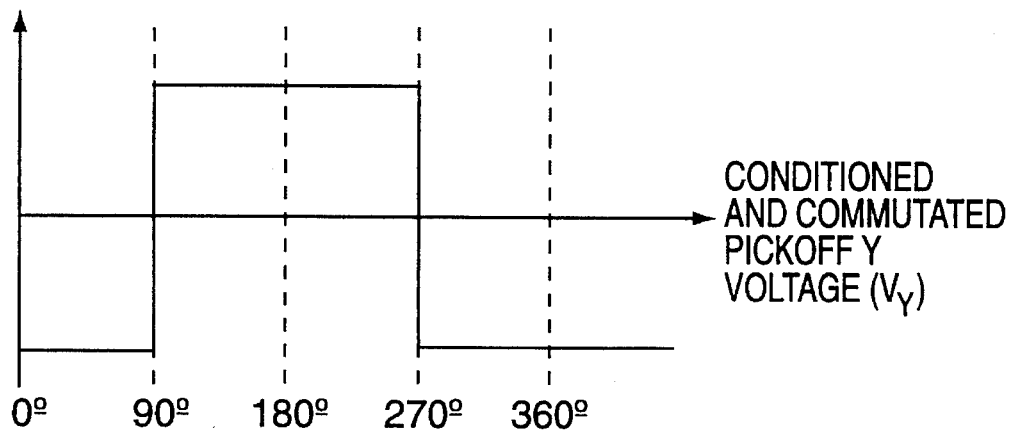
Figure 5C:
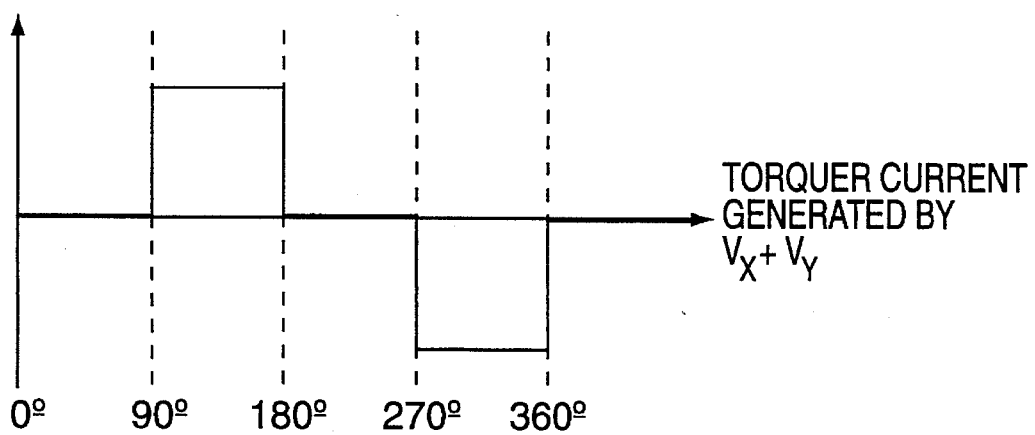
Figure 5D:
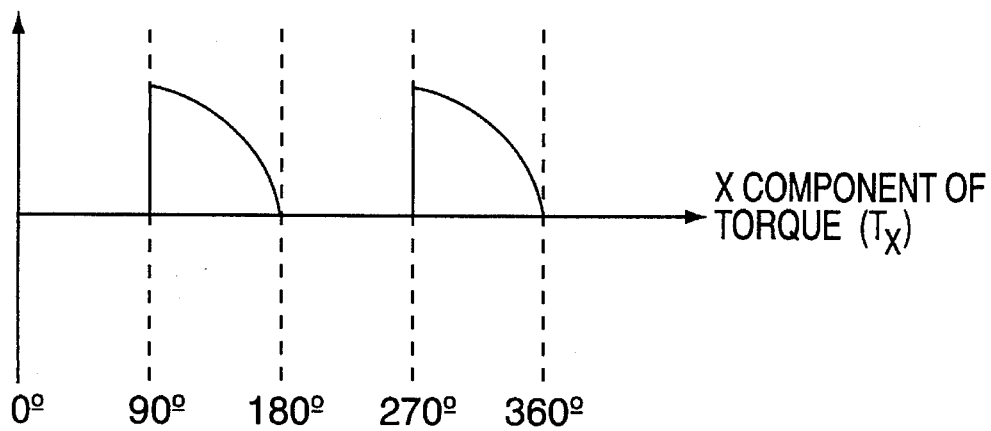
Figure 5E:
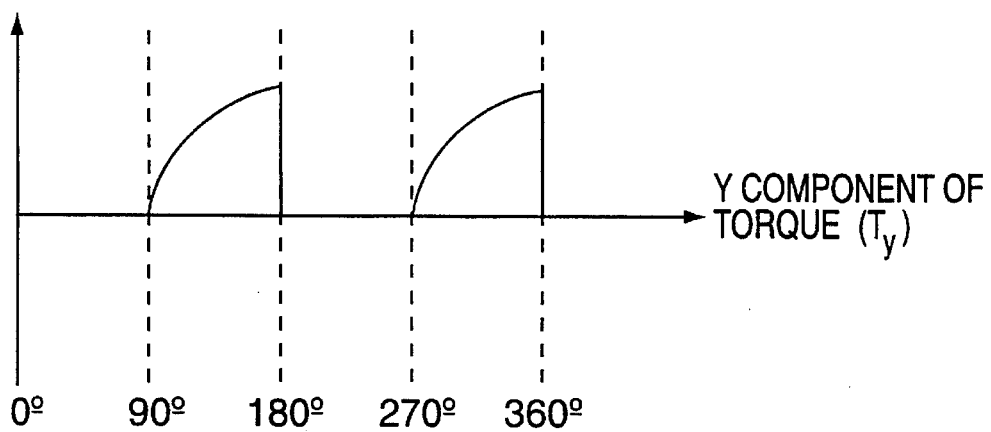
Figure 5F:
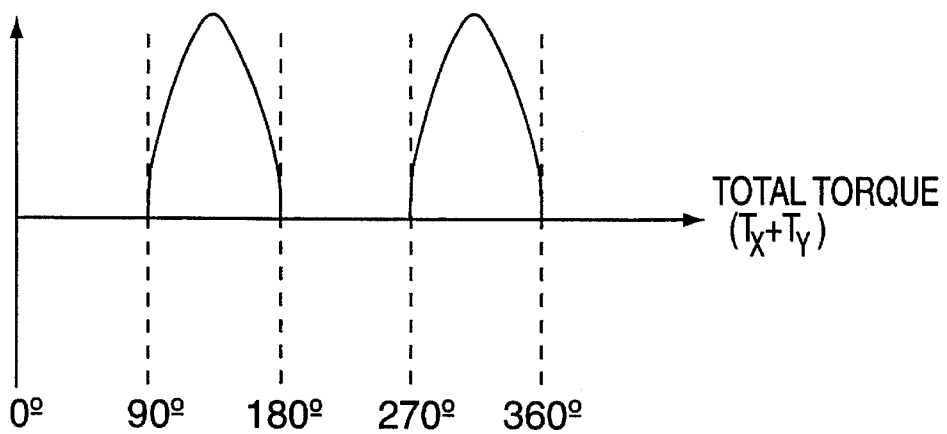

FIGS. 5a through 5f depict the waveshapes resulting from equal and simultaneous angular rates applied to both axes. FIG. 5a is the processed tilt information which has been commutated by the induced open stator phase voltage. In FIG. 5b, $V_y$ is equal in amplitude to $V_x$ for equal angular rates and has been commutated by the induced open stator phase voltage phase shifted 90 degrees. The summing current source generates the resulting waveform, FIG. 5c. FIGS. 5d and 5e show the X and Y torque vector components. The torque waveforms, shown in FIGS. 5d, 5e, are the products of constant current levels and the sinusoidal moment arms, as explained with respect to FIG. 4. The net torque on the rotor is shown in FIG. 5f. The resulting torque is at an angle of 45 degrees as would be expected to rebalance equal deflections about both axes, X and Y.

FIG. 6 is a functional block diagram of the electronics system 50 which generates the waveforms depicted in the previous FIGS. 3a, 3b, 4a, 5a and 5b. The preamplified and squared conditioned open phase voltage controls the state of the X-axis commutation switch 52. The same preamplified open phase voltage output is integrated, phase shifted 90 degrees, and squared to provide a command to the Y-axis commutation switch 54. The transfer function for the X-axis and Y-axis channels are identical and thus it will suffice to discuss the operation of a single channel. The mathematical relationship determining the mechanical plant transfer function consists of an integration and nutation dynamics. The latter is an underdamped second order system. The electronic channel provides the gain, phase and filtering characteristics to ensure optimal servo loop dynamics at the required bandwidth. The processed Hall sensor outputs determine the state of the commutation switches 52, 54 which control the timing and polarity of the tilt information signal. The commutated tilt information of both axes are then summed and power amplified in driver 56 and delivered to the single torquer coil 26. The conditioned pick-off outputs which are fed to the commutation switches 52, 54 are also filtered and scaled to provide rate information for both axes, X and Y. Readouts 51 and 53 provide X-axis and Y-axis signals, respectively, indicative of the actual spin axis position in a cartesian coordinate format.

Figure 7:
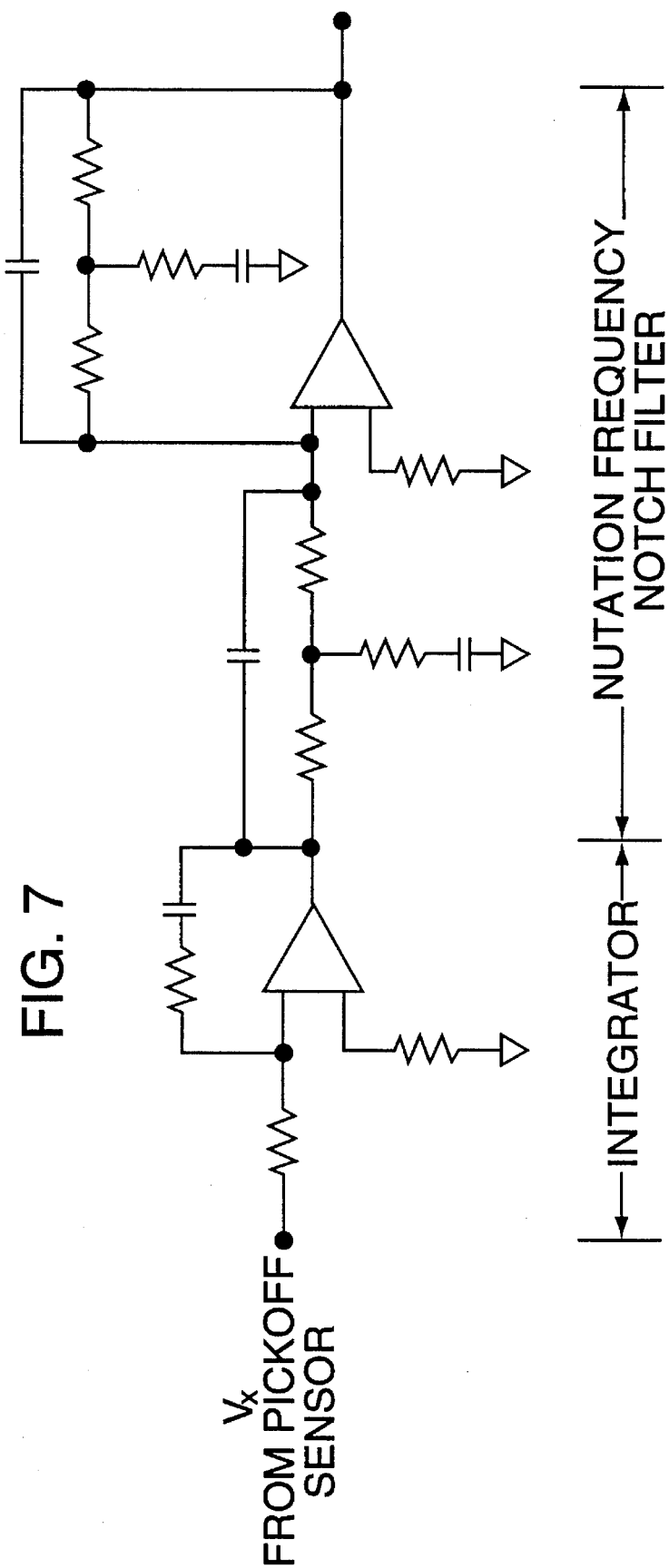
FIG. 7 is a simplified illustration, for a single channel, of the servo compensation network and nutation notch filter shown in FIG. 6.
Figure 8:
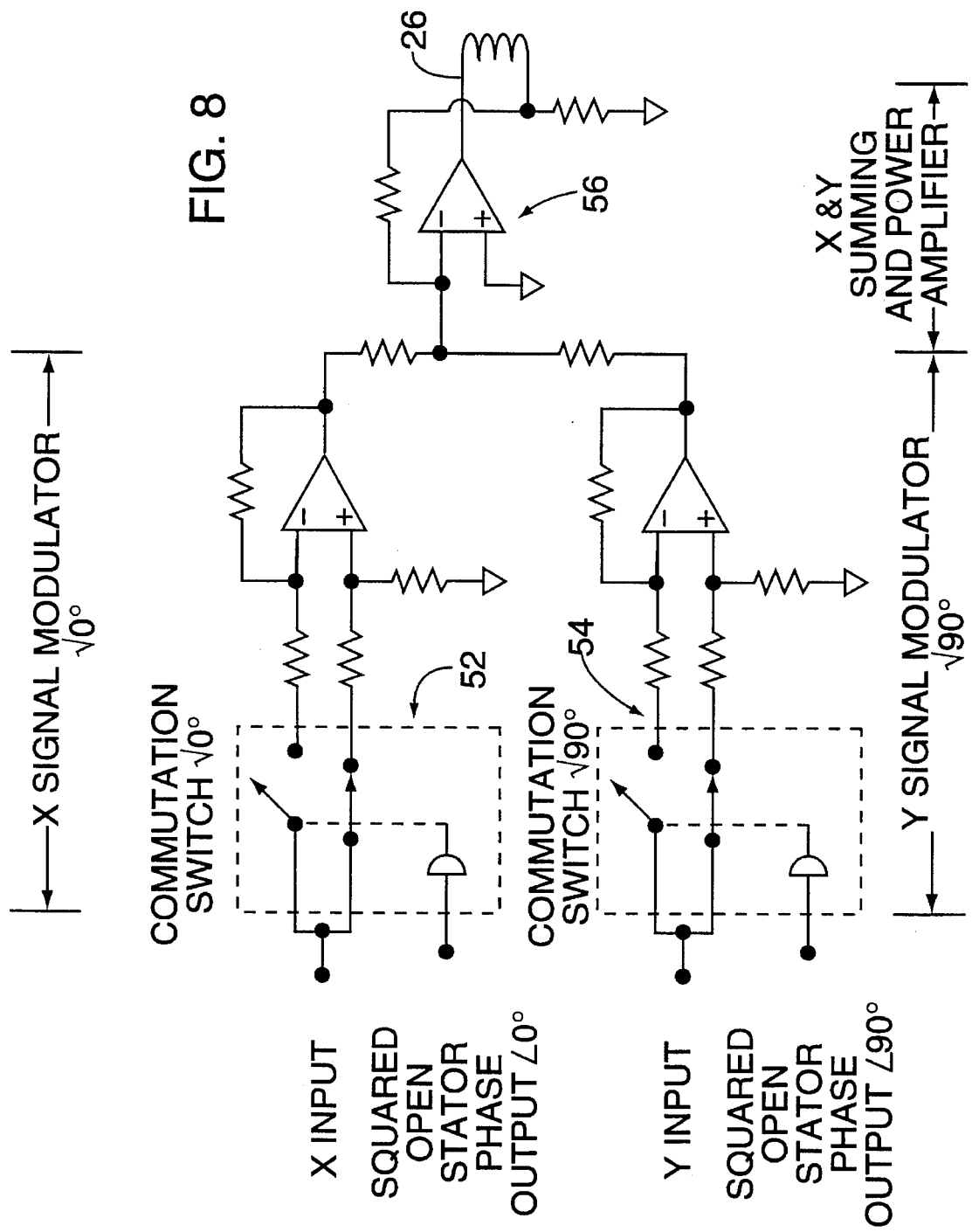
FIG. 8 illustrates in more detail the commutation and torquer drive electronics.

FIG. 7 illustrates the servo compensation electronics of a single channel which consists of an integrator and nutation notch circuits. FIG. 8 is the commutation and torque drive electronics. The state of the squared induced open stator phase voltage, high or low, determines whether the processed tilt information is fed to the non-inverting or inverting terminal of the amplifiers before being summed in the power stage which delivers the required current to the torquer.

What is claimed is:

1. A two degree of freedom gyroscope including a motor with a stator having driven phase windings and open phase windings and a permanent magnet rotor connected to rotate the rotatable portion of the gyroscope around a null spin axis, comprising:

motor drive means for driving the permanent magnet rotor to rotate around an actual spin axis, with a voltage induced in the open stator phase windings corresponding to the position of the permanent magnet rotor poles for motor commutation;

said open stator phase windings including a first winding arrangement and an oppositely disposed second winding arrangement;

said first and second open stator phase winding arrangements each having two leads leading therefrom;

one of the two leads from each of the first and second winding arrangements being jumped and the other of the two leads from each of the winding arrangements providing outputs relating to the position of the permanent magnet rotor poles for motor commutation;

sensing means for sensing the X-axis and Y-axis deviations of the actual spin axis of the rotor from the null spin axis and providing an X-axis and a Y-axis signal and which signals are a function of the deviation;

a torquer coil having at least one loop which lies in a plane orthogonal to the null spin axis and which is disposed in proximity to the permanent magnet rotor; and torquer drive means responsive to the X-axis signal and the Y-axis signal when the actual spin axis of the permanent magnet rotor is displaced from the null spin axis for providing drive current, at the proper time and with the proper polarity, to said torquer coil to urge the permanent magnet rotor to a position wherein the actual spin axis coincides with the null spin axis.

2. A gyroscope as described by claim 1, wherein:

said torquer drive means includes an X-axis commutation switch and a Y-axis commutation switch both responsive to the voltage induced in the open stator phase windings which provides the commutation angle; and summing means for combining the outputs of said X-axis commutation switch and said Y-axis commutation switch.

3. A gyroscope as described by claim 1, wherein:

the first and second winding arrangements are connected in series for providing the induced voltage.

Please add claims 4, 5, 6 and 7 as follows.

4. A two degree of freedom gyroscope, comprising:

a motor including a stator having a pair of driven phase windings and a pair of open phase windings, and a permanent magnet rotor connected to rotate the rotatable portion of the gyroscope around a null spin axis;

motor drive means for driving the permanent magnet rotor to rotate around an actual spin axis with a voltage induced in the open stator phase windings corresponding to the position of the permanent magnet rotor poles for motor commutation;

said open stator phase windings include a first winding arrangement and an oppositely disposed second winding arrangement;

said first and second open stator phase winding arrangements each having two leads leading therefrom;

one of the two leads from each of the winding arrangements providing outputs relating to the position of the permanent magnet rotor poles for motor commutation;

sensing means for sensing the X-axis and Y-axis deviations of the actual spin axis of the rotor from the null spin axis and providing an X-axis and a Y-axis signal and which signals are a function of the deviation;

a torquer coil having at least one loop which lies in a plane orthogonal to the null spin axis and which is disposed in proximity to the permanent magnet rotor; and torquer drive means responsive to the X-axis signal and the Y-axis signal when the actual spin axis of the permanent magnet rotor is displaced from the null spin axis for providing drive current, at the proper time and with the proper polarity, to said torquer coil to urge the permanent magnet rotor to a position wherein the actual spin axis coincides with the null spin axis.

5. A two degree of freedom gyroscope comprising:

a motor including a stator having a pair of driven phase windings and a pair of open phase windings, and a permanent magnet rotor connected to rotate the rotatable portion of the gyroscope around a null spin axis;

motor drive means for driving the permanent magnet rotor to rotate around an actual spin axis, with a voltage induced in the open stator phase windings corresponding to the position of the permanent magnet rotor poles for motor commutation;

the pair of stator windings connected in series for providing the induced voltage;

sensing means for sensing the X-axis and Y-axis deviations of the actual spin axis of the rotor from the null spin axis and providing an X-axis and a Y-axis signal and which signals are a function of the deviation;

a torquer coil having at least one loop which lies in a plane orthogonal to the null spin axis and which is disposed in proximity to the permanent magnet rotor; and torquer drive means responsive to the X-axis signal and the Y-axis signal when the actual spin axis of the permanent magnet rotor is displaced from the null spin axis for providing drive current, at the proper time and with the proper polarity, to said torquer coil to urge the permanent magnet rotor to a position wherein the actual spin axis coincides with the null spin axis.

6. A gyroscope as described by claim 5, including:

said open stator phase windings include a first winding arrangement and an oppositely disposed second winding arrangement;

said first and second open stator phase winding arrangements each having two leads leading therefrom; and one of the two leads from each of the windings being jumped and the other of the two leads from each of the winding arrangements providing outputs relating to the position of the permanent magnet rotor poles for motor commutation.

7. A gyroscope as described by claim 6, including:

the first and second winding arrangements connected in series for providing the induced voltage.

* * * * *